United States Patent
Seo

(10) Patent No.: US 9,747,501 B2
(45) Date of Patent: Aug. 29, 2017

(54) FIRE DETECTION METHOD AND APPARATUS

(71) Applicant: IIST CO., LTD., Gyeonggi-do (KR)

(72) Inventor: Burm Suk Seo, Gyeonggi-do (KR)

(73) Assignee: IIST CO., LTD., Gyeonggi-do (KR)

(*) Notice: Subject to any disclaimer, the term of this patent is extended or adjusted under 35 U.S.C. 154(b) by 143 days.

(21) Appl. No.: 14/434,041

(22) PCT Filed: Oct. 15, 2013

(86) PCT No.: PCT/KR2013/009198
§ 371 (c)(1),
(2) Date: Apr. 7, 2015

(87) PCT Pub. No.: WO2014/061964
PCT Pub. Date: Apr. 24, 2014

(65) Prior Publication Data
US 2015/0242687 A1 Aug. 27, 2015

(30) Foreign Application Priority Data

Oct. 16, 2012 (KR) .................. 10-2012-0114756

(51) Int. Cl.
*G06K 9/00* (2006.01)
*G08B 17/00* (2006.01)
(Continued)

(52) U.S. Cl.
CPC ..... *G06K 9/00624* (2013.01); *G06K 9/00771* (2013.01); *G06K 9/4652* (2013.01); *G06K 9/6202* (2013.01); *G06T 7/90* (2017.01); *G08B 17/00* (2013.01); *G06T 2207/10016* (2013.01); *G06T 2207/30188* (2013.01); *G06T 2207/30232* (2013.01)

(58) Field of Classification Search
CPC combination set(s) only.
See application file for complete search history.

(56) References Cited

U.S. PATENT DOCUMENTS

2002/0021221 A1* 2/2002 Okamoto ............. G08B 17/125
340/577
2005/0253728 A1* 11/2005 Chen .................... G08B 17/125
340/577
(Continued)

FOREIGN PATENT DOCUMENTS

CN          101106727       1/2008
KR      1020030093023    12/2003
(Continued)

OTHER PUBLICATIONS

Juan Chen, "Study on Method of Multi-Feature Fusion Based Video Flame Detection", Chinese Master's Theses Full-text Database Information Science and Technology, Jul. 15, 2010.
(Continued)

*Primary Examiner* — Alex Liew
(74) *Attorney, Agent, or Firm* — IP & T Group LLP

(57) ABSTRACT

A fire detection method and apparatus accurately detects a fire. The fire detection method includes obtaining RGB data from an image; calculating at least one index related to the attributes of fire using the obtained RGB data; and determining the occurrence of a fire using the index.

16 Claims, 5 Drawing Sheets

(51) Int. Cl.
    *G06K 9/46*     (2006.01)
    *G06K 9/62*     (2006.01)
    *G06T 7/90*     (2017.01)

(56) References Cited

U.S. PATENT DOCUMENTS

| | | |
|---|---|---|
| 2010/0073477 A1 | 3/2010 | Finn et al. |
| 2010/0098335 A1* | 4/2010 | Yamagishi ............ G08B 17/125 |
| | | 382/168 |
| 2012/0045090 A1* | 2/2012 | Bobbitt .............. G06K 9/00771 |
| | | 382/103 |
| 2015/0242687 A1* | 8/2015 | Seo ........................ G08B 17/00 |
| | | 382/103 |

FOREIGN PATENT DOCUMENTS

| | | |
|---|---|---|
| KR | 1020060135177 | 12/2006 |
| KR | 1020080054366 | 6/2008 |
| KR | 1020090054522 | 6/2009 |
| KR | 1020110022133 | 3/2011 |
| KR | 1020110048417 | 5/2011 |

OTHER PUBLICATIONS

Yan Hu et al., "Fire-smoke Recognition Based on Block Segmentation and Support Vector Machine", Computer Simulation, Sep. 20, 2012, 29(9):170-173.

Office Action issued by the State Intellectual Property Office on Sep. 29, 2016.

* cited by examiner

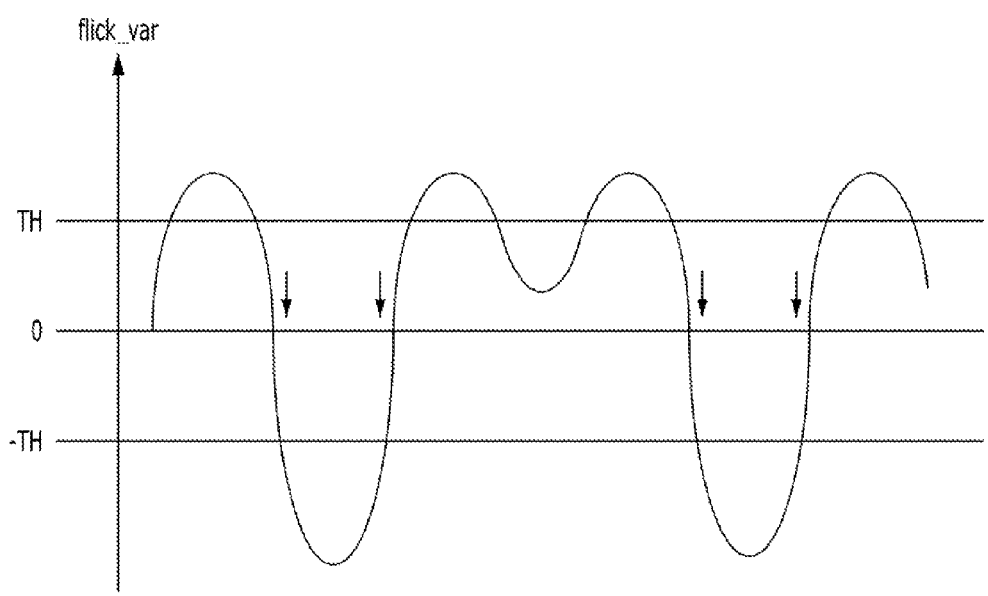

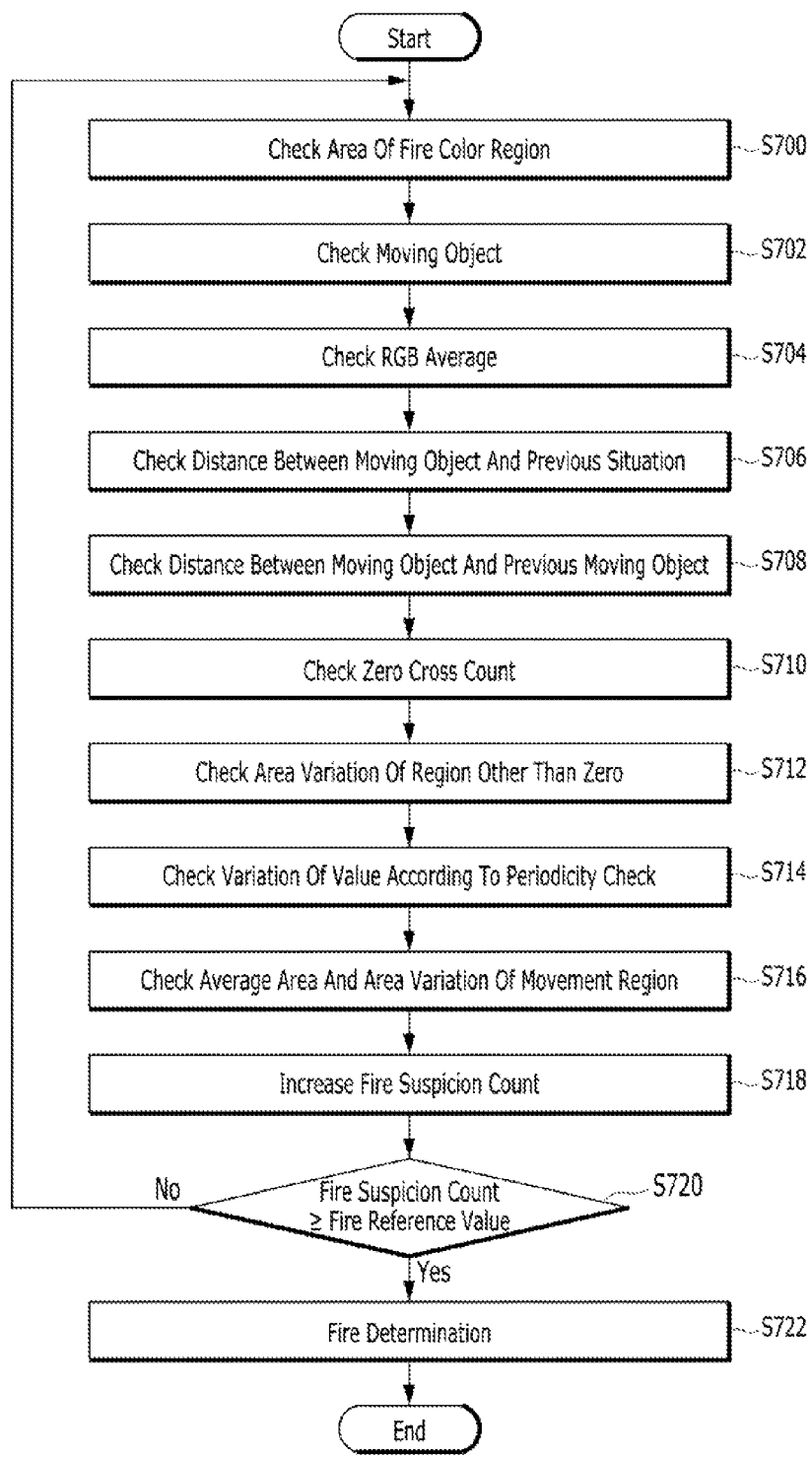

FIRE DETECTION METHOD AND APPARATUS

This application is a national stage application of PCT/KR2013/009198 filed on Oct. 15, 2013, which claims priority of Korean patent application number 10-2012-0114756 filed on Oct. 16, 2012. The disclosure of each of the foregoing applications is incorporated herein by reference in its entirety.

TECHNICAL FIELD

The present disclosure relates to a fire detection method and apparatus capable of accurately detecting occurrence of a fire.

BACKGROUND ART

Currently, fire detection apparatus for detecting a fire exist, but the conventional fire detection apparatus have a low accuracy in fire detection. Thus, even when an actual fire has not occurred, cases of being wrongly detected as a fire are frequently generated. When a fire has occurred, a fire extinguishing system is directly driven. Therefore, when the fire extinguishing system operates due to a wrong detection as a fire in spite of non-fire, serious damage is caused to manufactured goods in an area in which the fire extinguishing system has operated.

DISCLOSURE

Technical Problem

Various implementations are directed to provide a fire detection method and apparatus capable of accurately detecting occurrence of a fire.

Technical Solution

In order to achieve the above object, according to one aspect of the present invention, there is provided a fire detection method including: acquiring RGB data from an image; obtaining one or more indexes related to attributes of a fire using the acquired RGB data; and determining whether a fire has occurred using the indexes.

According to another aspect of the present invention, there is provided a fire detection method including: partitioning an image into blocks which includes a plurality of frames; determining whether a fire is suspected with respect to the blocks; and determining that a fire has occurred when blocks determined to be suspected as a fire exist successively, and the number of the blocks is equal to or greater than a fire reference value.

According to still another aspect of the present invention, there is provided a fire detection apparatus including: an index unit for generating one or more indexes related to attributes of a fire using RGB data which is acquired from an image; and a fire determination unit for determining whether a fire has occurred using the indexes, which have been generated by the index unit.

Advantageous Effects

According to the fire detection method and apparatus according to the present invention, since a fire is detected using indexes related to the attributes of a fire, a fire can be accurately detected, and also a non-fire, which is not an actual fire but may be misconceived as a fire, can be actually detected.

BRIEF DESCRIPTION OF DRAWINGS

FIG. 5 is a view showing a process for checking the periodicity of a fire color region in accordance with an implementation of the present invention;

FIG. 6 is a view showing a change in flicker in accordance with an implementation of the present invention;

FIG. 7 is a flowchart showing a fire detection process in accordance with an implementation of the present invention.

MODE FOR INVENTION

Hereafter, exemplary implementations of the present invention will foe described in detail with reference to the accompanying drawings.

The present invention relates to a fire detection method and apparatus. The fire detection apparatus may be an apparatus for detecting only fire, or may be an apparatus which is connected to a CCTV and can defect both intruders and a fire with a CCTV connected thereto. In addition, the fire detection apparatus may foe an apparatus which receives an image from an external camera, analyzes the received image, and detects whether or not a fire occurs. That is to say, the fire detection apparatus according to the present invention is not limited to a specific apparatus, and has only to analyze an image and to detect a fire.

Hereinafter, a fire detection method will foe described, and then a fire detection apparatus will foe described.

First, the fire detection method will be described.

Figure 1:
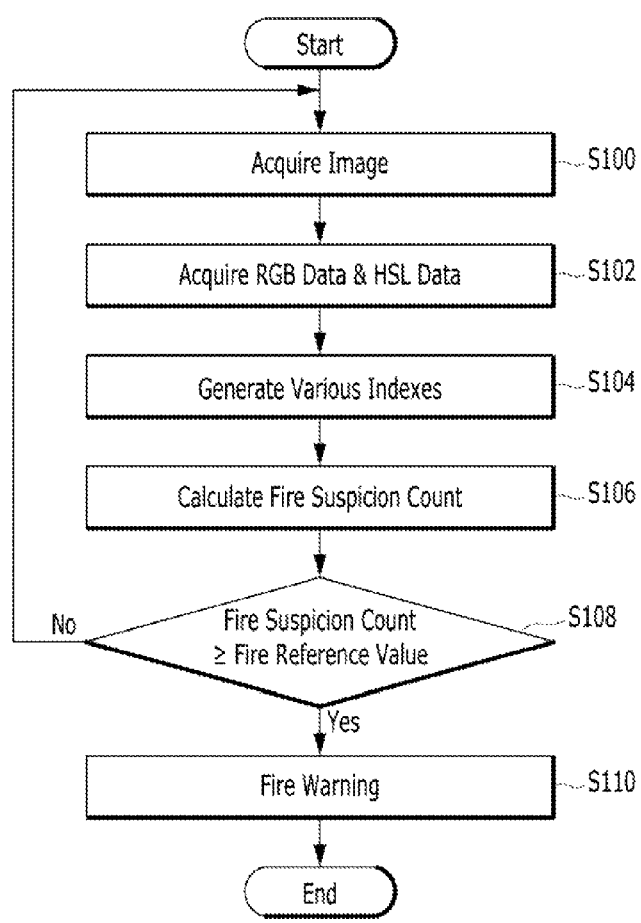
FIG. 1 is a flowchart schematically showing a fire detection process in accordance with an implementation of the present invention.
Figure 2:
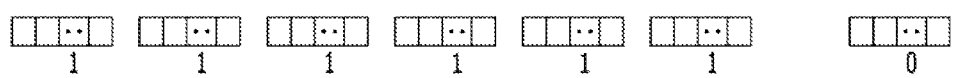
FIG. 2 is a view schematically showing a fire determination method in accordance with an implementation of the present invention.

FIG. 1 is a flowchart schematically showing a fire detection process in accordance with an implementation of the present invention, and FIG. 2 is a view schematically showing a fire determination method in accordance with an implementation of the present invention.

Referring to FIG. 1, a fire detection apparatus acquires an image in step S100. The image, which is an image captured by a sensor, e.g. a camera or the like, may be an image captured directly by the fire detection apparatus, or may be an image captured and then transmitted by another apparatus.

Subsequently, the fire detection apparatus acquires RGB data from the image and converts the RGB data into hue, saturation and lightness (HSL) data in step S102. Here, the hue represents color, the saturation represents chroma, and the lightness represents luminosity.

Then, the fire detection apparatus calculates various indexes to be used for fire determination using the RGB data and the HSL data in step S104. For example, the fire detection apparatus may generate a periodicity index, a moving object index, a zero cross index, and the like, to be described later, using the RGB data and the HSL data.

Subsequently, the fire detection apparatus calculates a fire suspicion count using the generated various indexes in step S106. For example, the fire detection apparatus may determine whether or not a fire is suspected every block, and may assign HIGH (i.e. "1") to blocks in which a fire is suspected and assign Low (i.e. "0") to blocks in which a fire is not suspected. Here, the image is partitioned into a plurality of blocks, and each block includes a plurality of frames, e.g. 30 frames. The fire detection apparatus increases a fire suspicion count when a block has a value of "1", and initializes the fire suspicion count when a block has a value of "0". That is to say, the fire suspicion count can increase only when frame blocks successively have a value of "1".

Then, the fire detection apparatus determines whether or not the fire suspicion count is equal to or greater than a fire reference value in step S108. For example, the fire detection apparatus determines whether or not the fire suspicion count is equal to or greater than six. When six successive blocks have a value of "1", as illustrated in FIG. 2, the fire detection apparatus determines that a fire has occurred. It goes without saying that the criterion for determining whether or not a fire has occurred may be variously changed. However, since blocks in which a fire is suspected must successively exist when a fire has occurred, it is efficient to determine that a fire has occurred when the number of successive blocks in which a fire is suspected is equal to or greater than the fire reference value. When such a method is used, although an error occurs in fire determination for a specific block, such an error hardly exert an influence on detecting a fire and a non-fire.

When the fire suspicion count is less than the fire reference value, step S100 is again performed.

In contrast, when the fire suspicion count is equal to or greater than the fire reference value, the fire detection apparatus may generate a fire warning in step S110. For example, the fire detection apparatus may display whether or not a fire has occurred on a display, and may generate a warning sound. It goes without saying that the fire detection apparatus may notify another apparatus that a fire has occurred.

In summary, the fire detection method and apparatus according to the present invention are implemented to generate various indexes using RGB data and HSL data, and to determine whether or not a fire has occurred using the generated indexes.

The conventional fire detection apparatus has a low accuracy in fire detection, and frequently makes a wrong determination as a fire even when a fire has not actually occurred. Due to the characteristics of a fire, whenever it is determined that a fire has occurred, a fire extinguishing system operates. Once a fire extinguishing system operates, serious damage may be caused to equipment existing in an area in which it is determined a fire has occurred. Therefore, an apparatus capable of accurately detecting whether or not a fire has occurred has been required.

According to the fire detection method according to the present invention, since various indexes related to the attributes of fire are utilized, an actual fire can be accurately detected, and a case in which a fire may be suspected but an actual fire has not been occurred can be accurately detected. Especially, according to the fire detection method according to the present invention, since various attributes of fire are reflected as indexes, a more accurate defection of a fire can be achieved than in the conventional method, which has been confirmed through simulations.

Hereinafter, a process for generating various indexes for fire detection will be described, and then an actual fire detection process will be described.

First, an index generation process will be described. For convenience of description, HSL levels are assumed to be in a range of 0 to 255.

Figure 3:
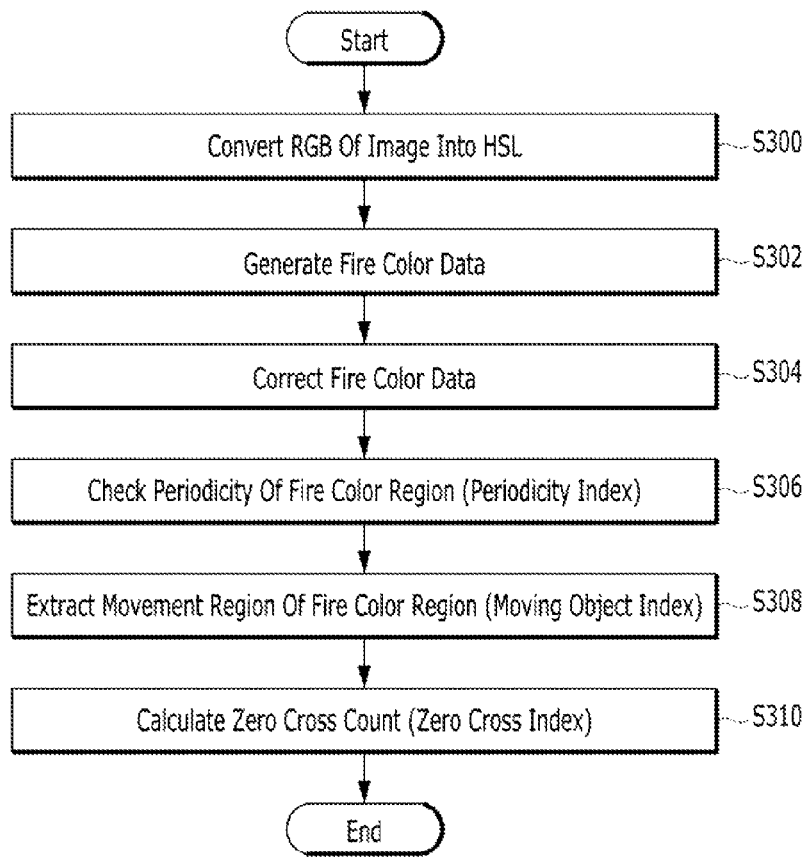
FIG. 3 is a flowchart schematically showing an index generation process in accordance with an implementation of the present invention.
Figure 4:
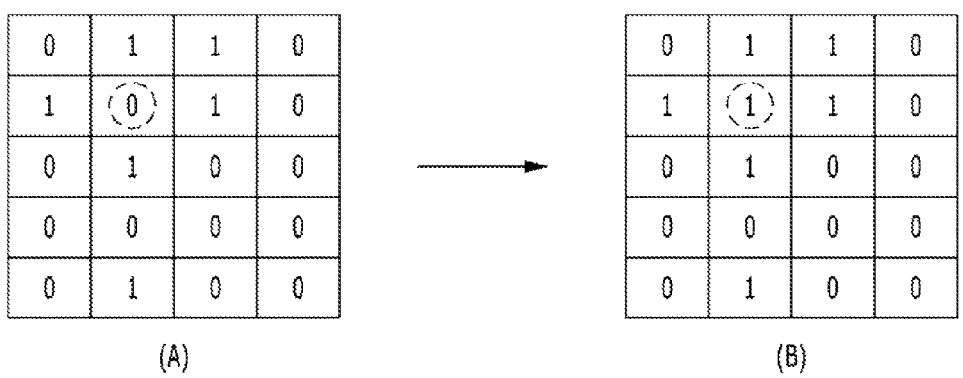
FIG. 4 is a view showing HSL data in accordance with an implementation of the present invention.

FIG. 3 is a flowchart showing an index generation process in accordance with an implementation of the present invention, FIG. 4 is a view showing HSL data in accordance with an implementation of the present invention, FIG. 5 is a view showing a process for checking the periodicity of a fire color region in accordance with an implementation of the present invention, and FIG. 6 is a view showing a change in flicker in accordance with an implementation of the present invention.

Referring to FIG. 3, the fire detection apparatus converts RGB data of an image into HSL data (of the image) in step S300. Most fires have a saturation level of 255. However, when the values of red (R), green (G) and blue (B) in a fire region are the equal to each other and are close to 255, the saturation therein may be zero. Therefore, in this case, the saturation in the corresponding region is changed to 255. It may be assumed as the saturation of a fire that R, G and B exceed a threshold value, e.g. 240.

Then, the fire detection apparatus generates first fire color data representing fire color regions from HSL data in step S302. Specifically, the fire detection apparatus sets a pixel determined to foe a fire color region to HIGH (i.e. "1") and sets a pixel determined not to be a fire color region to LOW (i.e. "0") in the current frame, thereby generating first fire color data. Consequently, fire color data may be expressed as shown in FIG. 4(A).

Subsequently, the fire detection apparatus may generate second fire color data by correcting the first fire color data in step S304. For example, the fire detection apparatus may generate first fire color data on the basis of a first threshold value, which is a relatively high value, and then generate second fire color data on the basis of a second threshold value which is lower than the first threshold value. The second fire color data may be obtained by changing a pixel, which is not a fire color region in the first fire color data, to a fire color region. Preferably, when a pixel is not a fire color region in first fire color data, but is surrounded by fire color regions, the pixel may be changed to a fire color region in second fire color data. For example, in the step of generating first fire color data, the fire detection apparatus sets a corresponding pixel to "1" only when each of H, S and L is greater than a threshold value and thus all of H, S and L have a value of "1". In contrast, in the step of generating second fire color data, although at least one, preferably just one, of H, S and L of a pixel does not have a value of "1", the fire detection apparatus may change the pixel from "0" to "1", as shown in FIG. 4, when pixels surrounding the pixel have a value of "1". As a result of simulations, it is confirmed that maintaining the criteria of S and L among H, S and L and mitigating and applying the criterion of hue (H) are actually suitable for correction of fire color regions. That is to say, when each of S and L is equal to or greater than an initial threshold value, and H is less than a first threshold value but is greater than a second threshold value, the correction process can be applied. Such an HSL data correction process may be applied because there is a high probability that a pixel surrounded by fire color regions is a fire color region.

Then, the fire detection apparatus checks the periodicity of a fire color region in step S306. Specifically, the fire detection apparatus backs up the current frame Img+0, and calculates each difference between the gray value of the backup current frame Img+0 and the gray values of other frames Img+1 to Img+n included in the same block as the current frame. For example, as illustrated in FIG. 5, the fire detection apparatus may obtain a first operation value "result1" for a fire color region (i.e. a pixel in which HSL is "1") by performing an operation on the current frame Img+0 with a 2×2 mask having the values of "−1", and may obtain a second operation value "result2" by performing an operation on the next frame Img+1 with a 2×2 mask having the values of "1". Then, the fire detection apparatus adds the operation values to each other and divides the added value by two, thereby obtaining a difference value "Diff", i.e. Diff=(result1 and result2)/2. Such an operation, of obtaining a difference value "Diff" is performed with respect to each of the other frames Img+1 to Img+n included in the same block as the current frame Img+0. Consequently, difference values "Diff" as many as the number of frames included in one block may be generated in a fire color region. The fire detection apparatus calculates a standard variance and the average of the generated difference values "Diffs", obtains a periodicity index by dividing the standard variance by the average, and determines that the fire color region of the block is periodical when the periodicity index is greater than a predetermined threshold value. Checking the periodicity of a fire color region, as described above is performed to distinguish a situation, such as the light of a headlight, which is not fire but may be suspected as a fire. Generally, a fire has a feature wherein a fire color region appears aperiodically while light of a headlight and the like have a feature wherein a fire color region appears periodically. Therefore, when the periodicity of a fire color region is checked, a non-fire can be distinguished. The above description has been given on the case where a non-fire is detected by checking the periodicity of one block. However, in accordance with another implementation of the present invention, a situation may be determined to be a non-fire when it is determined that, for example, two successive blocks are periodical for the safety of detection.

Subsequently, the fire detection apparatus extracts a movement region of a fire color region in step S308. Specifically, pixel values Pixel_value and variances are calculated as expressed in equation 1 below. The pixel values Pixel_value are obtained according to each pixel, and the variances are values obtained by subtracting a background from each pixel value Pixel_value. Here, the background means the average of a corresponding pixel value and a corresponding variance in a previous frame. Whenever a variance is greater than a preset threshold value, a moving object pixel count increases by one. That is to say, variances according to pixels are calculated with respect to frames included in the same block, each variance is compared with the threshold value, a moving object pixel count increases by one whenever the variance is greater than the threshold value. Consequently, when the above process is performed on all the frames included in the same block, a moving object pixel count (i.e. a moving object index) corresponding to a final count can be obtained. Accordingly, in view of frames, when the above process is performed on all the frames included in the block, one frame having moving object pixel counts according to pixels can be acquired. For example, when one frame includes 30 frames, the maximum moving object pixel count which a pixel can have is "30". A fire has an attribute that shows a large variation in each of R, G and B. Therefore, when the moving object pixel count of pixels in a fire color region is small, it means that a variation is small, and thus, the fire detection apparatus determines that an actual fire has not occurred. In contrast, when the moving object pixel count of pixels in a fire color region is greater than a preset threshold value, the fire detection apparatus may determine that the fire color region is a fire suspicion region. Consequently, the fire detection apparatus can detect a non-fire through the moving object index even with respect to a fire color region.

$$Pixel\_value=(R+G+B)/3$$

$$Variance=Pixel\_value-background$$

$$background=(background+variance)/2 \qquad (1)$$

Then, the fire detection apparatus calculates a zero cross count in step S310. Specifically, the fire detection apparatus calculates a flicker variation value Flick_var using equation 2 below. For example, the fire detection apparatus may calculate a flicker variation value Flick_var according to each pixel with respect to the respective frames, especially with respect to pixels of a fire color region, of a block. Consequently, a flicker variation value Flick_var is generated according to each pixel of a frame, and a flicker variation value Flick_var according to each pixel may be shown, as illustrated in FIG. 6, in view of a block unit. In this case, whenever the flicker variation value Flick_var of a specific pixel exceeds an upper limit value "TH" or a lower limit value "−TH" in a corresponding frame, and then exceeds the lower limit value or the upper limit value, respectively, in a next frame, the fire detection apparatus increases the zero cross count by one. That is to say, the fire detection apparatus counts the number of times of passing through zero at a state, in which the lower limit value and the upper limit value are exceeded, with respect to a specific pixel. The fire detection apparatus counts the number of arrows in FIG. 6. Therefore, when the zero cross count is performed on all the frames included in one block, a zero cross index representing a counted value according to each pixel can be generated. A fire has a flicker property, and shows a great change in flicker. Therefore, when a zero cross count in a fire color region exceeds a preset threshold value, the fire detection apparatus may determine the fire color region to be a fire suspicion region. Although the above description has been given on the case where zero "0" is set as a bias value, another value may be set as the bias value.

$$flick\_var=-pre\_pre*0.25+pre*0.25-cur*0.25 \qquad (2)$$

Here, "pre_pre" represents the gray value of RGB of a previous-previous frame, "pre" represents the gray value of RGB of a previous frame, and "cur" represents the gray value of RGB of a current frame.

In summary, according to the fire detection method and apparatus in accordance with the implementation of the present invention, a fire color region is detected using RGB data and HSL data; and then a periodicity index, a moving object index, a zero cross index, and the like are generated. That is to say, according to the fire detection method and apparatus, indexes related to at least one fire attribute are generated using RGB data and HSL data, and then it is determined whether or not a fire has occurred. Thus, the fire detection apparatus can accurately detect whether or not a fire has occurred, and can accurately extract the cases of non-fire.

Steps S306, S308 and S310 in FIG. 3 are not limited to the order illustrated in FIG. 3.

Hereinafter, a fire detection method in accordance with an implementation of the present invention will be described in detail with reference to the accompanying drawings.

FIG. 7 is a flowchart showing a fire detection process in accordance with an implementation of the present invention.

Referring to FIG. 7, according to the fire detection method in accordance with an implementation of the present invention, various indexes are obtained, and then the area of a movement region of a fire color region is Chechen in step S700. Specifically, according to the fire detection method, whenever a variance obtained by equation 1 exceeds a preset threshold value, a moving object pixel count is counted while increasing by one. Consequently, an accumulated moving object pixel count can be obtained according to each pixel with respect to all the frames of the same block.

According to the fire detection method, when the moving object pixel count in the fire color region is zero, it represents a case where there is no movement. Therefore, in this case, it is determined that a fire has not occurred, and a fire suspicion count is initialized. That is to say, the fire detection method restarts from the image acquisition step.

In contrast, according to the fire detection method, when the moving object pixel count in the fire color region is not zero, it is determined there is a movement, and it is determined whether or not the moving object pixel count is greater than a preset threshold value. According to the fire detection method, the moving object is set to HIGH (i.e. "1") when the moving object pixel count is greater than the preset threshold value, and the moving object is set to LOW (i.e. "0") when the moving object pixel count is equal to or less than the preset threshold value.

Then, according to the fire detection method, it is determined whether or not the moving object in the fire color region has a value of HIGH in step S702.

According to the fire detection method, when the moving object in the fire color region has a value of LOW, not a value of HIGH, it is determined that a fire has not occurred, and thus the fire suspicion count is initialized.

In contrast, according to the fire detection method, when the moving object in the fire color region has a value of HIGH, it is determined that a fire is suspected, the averages of the respective RGB in the fire color region are calculated, and it is checked whether or not the averages are greater than corresponding threshold values, respectively, in step S704.

According to the fire detection method, when at least one of the respective averages of RGB is equal to or less than a corresponding threshold value, it is determined that a fire has not occurred, and thus the fire suspicion count is initialized. In contrast, according to the fire detection method, when all the averages of RGB are greater than corresponding threshold values, respectively, it is determined that a fire is suspected, a distance between the moving object and a saturation in the fire color region, and it is determined whether or not the calculated distance is less than a threshold value in step S706. In accordance with an implementation of the present invention, according to the fire detection method, minimum distances to pixels having saturation values greater than a threshold, value are calculated with respect to pixels having a moving object of HIGH in the fire color region, and then a sum of the minimum distances is calculated. Thereafter, according to the fire detection method, a minimum distance average is calculated by dividing the sum of the minimum distances by the number of pixels having a moving object of HIGH. Subsequently, according to the fire detection method, when the minimum distance average is equal to or greater than a preset threshold value, it is determined that a fire has not occurred, and thus the fire suspicion count is initialized.

In contrast, according to the fire detection method, when the minimum distance average is less than the preset threshold value, it is determined that a fire is suspected, a distance between a current moving object and a previous moving object is calculated, and it is checked whether or not the distance is less than a preset threshold value in step S708. Specifically, according to the fire detection method, on the assumption that the location of a fire is constant, the minimum distances from a pixel at which a current moving object is HIGH to pixels at which a previous moving object is HIGH are obtained, and then an average of the minimum distances, i.e. a minimum distance average is calculated. According to the fire detection method, when the minimum distance average is equal to or greater than a preset threshold value, it is determined that a fire has not occurred, and the fire suspicion count is initialized.

In contrast, according to the fire detection method, when the minimum distance average is less than the preset threshold value, it is determined that a fire is suspected, and it is checked whether or not a zero cross count is greater than a threshold value in step S710.

According to the fire detection method, when the zero cross count corresponding to all the frames of one block is equal to or less than a preset threshold value, it is determined that a fire has not occurred, and the fire suspicion count is initialized.

In contrast, according to the fire detection method, when a pixel at which the zero cross count is greater than the threshold value exists, it is determined that a fire is suspected, and an area variation amount of a region in which a flicker change is not zero is checked in step S712.

According to the fire detection method, when the area variation amount is equal to or greater than a preset threshold value, it is determined that a fire has not occurred, and the fire suspicion count is initialized.

In contrast, according to the fire detection method, when the area variation amount is less than the preset threshold value, it is determined that a fire is suspected, a standard variance and an average of difference values "Diffs" according to periodicity check are calculated, a periodicity index is calculated by dividing the standard variance by the average, and it is checked whether or not the periodicity index is less than a predetermined threshold value in step S714.

According to the fire detection method, when the periodicity index is equal to or greater than the threshold value, it is determined that a fire has not occurred, and the fire suspicion count is initialized.

In contrast, according to the fire detection method, when the periodicity index is less than the threshold value, an average area and an area variation of a movement region are calculated according to each frame, and it is checked whether or not the area variation is less than a preset threshold value in step S716.

According to the fire detection method, when the area variation (i.e. the moving object pixel count) of a movement region calculated by the variances of R, G and B in a fire color region according to frames is equal to or greater than a preset threshold value, it is determined that a fire has not occurred, and the fire suspicion count is initialized.

In contrast, when the area variation (i.e. the moving object pixel count) of a movement region is less than the threshold value, the fire suspicion count increases in step S718.

Subsequently, according to the fire detection method, it is determined whether or not the fire suspicion count is equal to or greater than a fire reference value in step S720.

When the fire suspicion count is less than the fire reference value, the procedure restarts from step S700.

In contrast, according to the fire detection method, when the fire suspicion count is equal to or greater than the fire reference value, it is finally determined that a fire has occurred, and a warning sound or the like is generated in step S722. For example, according to the fire detection method, when a fire is suspected in six successive blocks, and thus the fire suspicion count is equal to the fire reference value "6", it is finally determined that a fire has occurred.

In summary, according to the fire detection method in accordance with an implementation of the present invention, it is determined whether or not a fire is suspected by sequentially checking various indexes related to the attributes of a fire with respect to each block, and it is determined that a fire has occurred when it is determined that a fire is suspected in successive blocks as many as a predetermined fire reference value.

The aforementioned order of determining the indexes related to the attributes of a fire is not limited to the order illustrated in FIG. 7, and may be variously changed.

Figure 8:
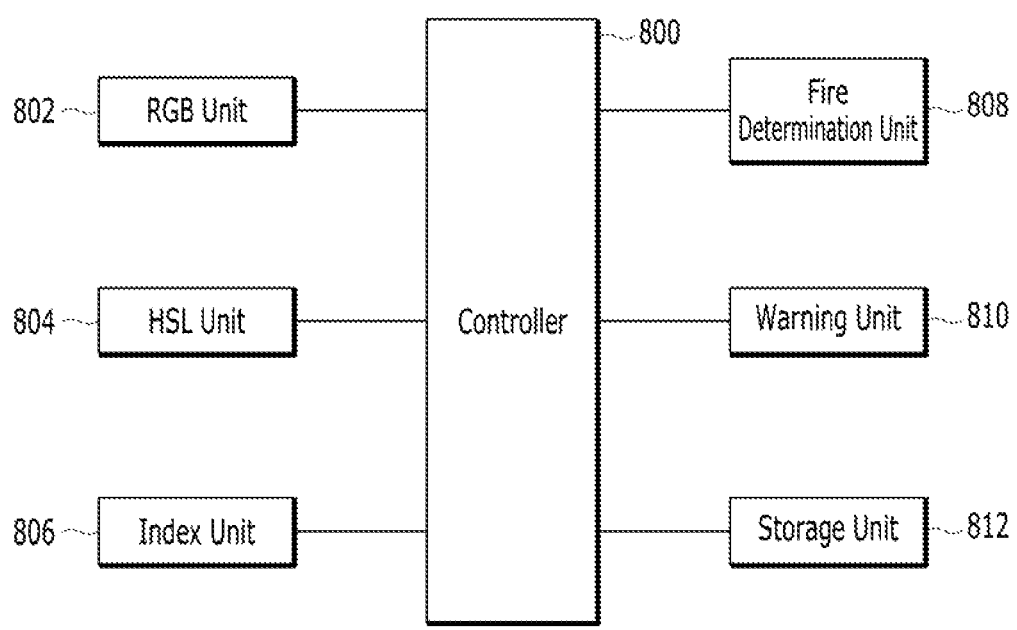
FIG. 8 is a block diagram illustrating the configuration of a fire detection apparatus in accordance with an implementation of the present invention.

FIG. 8 is a block diagram illustrating the configuration of a fire detection apparatus in accordance with an implementation of the present invention.

Referring to FIG. 8, the fire detection apparatus according to the present invention includes a controller 800, an RGB unit 802, an RSL unit 804, an index unit 806, a fire determination unit 808, a warning unit 810, and a storage unit 812.

The RGB unit 802 manages RGB data and gray values.

The HSL unit 804 converts the RGB data into HSL data, and manages the HSL data.

The index unit 806 calculates indexes related to the attributes of a fire using the RGB data and the HSL data.

The fire determination unit 808 determines whether or not a fire has occurred using the calculated indexes.

The warning unit 810 may generate a warning sound or the like when it is determined that a fire has occurred.

The storage unit 812 stores the RGB data, the HSL data, various indexes, and the like.

The controller 800 controls the entire operations of the components of the fire detection apparatus.

Although it is not described above, the fire detection apparatus may additionally include a communication unit capable of communicating with an external apparatus or a sensor unit which acquires an image. Furthermore, the HSL unit 804, the index unit 806, the fire determination unit 808 and controller 800 may be implemented by using a processor or computer.

It will be understood to those skilled in the art that the implementation of the present invention described is by way of example only. It will be understood by those skilled in the art that various corrections, changes and additions in form and details may be made therein without departing from the spirit and scope of the invention as defined by the appended claims, and also such corrections, changes and additions should be interpreted to be included in the scope of the present invention.

The invention claimed is:

1. A fire detection method comprising:
    acquiring RGB data from an image;
    converting the RGB data into HSL data;
    correcting the converted HSL data;
    extracting a fire color region from the corrected HSL data;
    obtaining the indexes using the RGB data and the corrected HSL data; and
    determining whether a fire has occurred using the indexes,
    wherein when all of H, S and L of the HSL data are HIGH, a corresponding pixel is a fire color region and thus is set to HIGH; and when at least one among H, S and L is LOW, a corresponding pixel is set to LOW, and
    wherein the correcting of the HSL data comprises changing a corresponding pixel from LOW to HIGH when only one among H, S and L is LOW and pixels surrounding the pixel are HIGH.

2. The method of claim 1, wherein the indexes comprises a periodicity index representing a periodicity of the fire color region, a moving object index representing a movement region of the fire color region, and a zero cross index representing a variation of flicker in the fire color region.

3. The method of claim 2, wherein the periodicity index is generated in such a manner as to obtain a first operation value through a mask operation with respect to a current frame belonging to a block, to obtain second operation values through a mask operation with respect to the other frames belonging to the block, to obtain differences between the first operation value and the second operation values, and to obtain a ratio of a standard variance of the differences and an average of the differences.

4. The method of claim 2, wherein the moving object index is generated by accumulating a moving object pixel count of all frames in a corresponding block in such a manner as to obtain an RGB average with respect to the respective pixels of a current frame, to obtain, according to each pixel, a variance corresponding to a difference between the obtained RGB average and an RGB average of a corresponding pixel of a previous frame, and to increase the moving object pixel count by one when the variance exceeds a preset threshold value.

5. The method of claim 2, wherein the zero cross index is generated by accumulating a zero cross count of all frames in a corresponding block in such a manner as: to generate a flicker variation value through gray values of a pervious-previous frame, a pervious frame, and a current frame with respect to a specific pixel; and to increase the zero cross count by one when the flicker variation value exceeds a lower limit value or an upper limit value in a next frame at a state in which the flicker variation value has exceeded the upper limit value or the lower limit value, respectively, in a current frame.

6. The method of claim 1, wherein the determining of whether a fire has occurred comprises:
    comparing a periodicity index with a corresponding threshold value;
    comparing a moving object index with a corresponding threshold value;
    comparing a zero cross index with a corresponding threshold value;
    determining that a fire is suspected in a corresponding block when it is determined in all the comparing that a fire is suspected; and
    determining that a fire has occurred when blocks determined to be suspected as a fire exist successively, and the number of the successive blocks is equal to or greater than a preset fire reference value.

7. The method of claim 6, wherein the determining of whether a fire has occurred further comprises:
    checking a distance between the moving object and a corresponding saturation; and
    checking a distance between the moving object and a previous moving object.

8. A fire detection method comprising:
    partitioning an image into blocks which comprises a plurality of frames;
    acquiring RGB data from the image;
    converting the RGB data into HSL data;
    correcting the converted HSL data;
    extracting a fire color region from the corrected HSL data;

obtaining one or more indexes related to attributes of a fire using the RGB data and the corrected HSL data;

determining whether a fire is suspected using the indexes with respect to the blocks; and determining that a fire has occurred when blocks determined to be suspected as a fire exist successively, and the number of the blocks is equal to or greater than a fire reference value, wherein when all of H, S and L of the HSL data are HIGH, a corresponding pixel is a fire color region and thus is set to HIGH; and when at least one among H, S and L is LOW, a corresponding pixel is set to LOW, wherein the correcting of the HSL data comprises changing a corresponding pixel from LOW to HIGH when only one among H, S and L is LOW and pixels surrounding the pixel are HIGH.

9. The method of claim 8, wherein the indexes comprises a periodicity index representing a periodicity of the fire color region, a moving object index representing a movement region of the fire color region, and a zero cross index representing a variation of flicker in the fire color region.

10. The method of claim 9, wherein the periodicity index is generated in such a manner as to obtain a first operation value through a mask operation with respect to a current frame belonging to a block, to obtain second operation values through a mask operation with respect to the other frames belonging to the block, to obtain differences between the first operation value and the second operation values, and to obtain a ratio of a standard variance of the differences and an average of the differences.

11. The method of claim 9, wherein the moving object index is generated by accumulating a moving object pixel count of all frames in a corresponding block in such a manner as to obtain an RGB average with respect to the respective pixels of a current frame, to obtain, according to each pixel, a variance corresponding to a difference between the obtained RGB average and an RGB average of a corresponding pixel of a previous frame, and to increase the moving object pixel count by one when the variance exceeds a preset threshold value.

12. The method of claim 9, wherein the zero cross index is generated by accumulating a zero cross count of all frames in a corresponding block in such a manner as: to generate a flicker variation value through gray values of a pervious-previous frame, a pervious frame, and a current frame with respect to a specific pixel; and to increase the zero cross count by one when the flicker variation value exceeds a lower limit value or an upper limit value in a next frame at a state in which the flicker variation value has exceeded the upper limit value or the lower limit value, respectively, in a current frame.

13. A fire detection apparatus comprising:

an index unit for generating one or more indexes related to attributes of a fire using RGB data which is acquired from an image;

a fire determination unit for determining whether a fire has occurred using the indexes, which have been generated by the index unit; and an HSL unit for converting the RGB data into HSL data and correcting the converted HSL data;

wherein, among the corrected HSL data, a pixel corresponding to a fire color region is set to HIGH, and the other pixels are set to LOW, wherein the indexes comprises a periodicity index representing a periodicity of the fire color region, a moving object index representing a movement region of the fire color region, and a zero cross index representing a variation of flicker in the fire color region, wherein the periodicity index is generated in such a manner as to obtain a first operation value through a mask operation with respect to a current frame belonging to a block, to obtain second operation values through a mask operation with respect to the other frames belonging to the block, to obtain differences between the first operation value and the second operation values, and to obtain a ratio of a standard variance of the differences and an average of the differences.

14. The apparatus of claim 13, wherein the moving object index is generated by accumulating a moving object pixel count of all frames in a corresponding block in such a manner as to obtain an RGB average with respect to the respective pixels of a current frame, to obtain, according to each pixel, a variance corresponding to a difference between the obtained RGB average and an RGB average of a corresponding pixel of a previous frame, and to increase the moving object pixel count by one when the variance exceeds a preset threshold value.

15. The apparatus of claim 13, wherein the zero cross index is generated by accumulating a zero cross count of all frames in a corresponding block in such a manner as: to generate a flicker variation value through gray values of a pervious-previous frame, a pervious frame, and a current frame with respect to a specific pixel; and to increase the zero cross count by one when the flicker variation value exceeds a lower limit value or an upper limit value in a next frame at a state in which the flicker variation value has exceeded the upper limit value or the lower limit value, respectively, in a current frame.

16. The apparatus of claim 13, wherein the fire determination unit determines whether a fire is suspected according to each block of the image using the indexes; and determines that a fire has occurred when blocks determined to be suspected as a fire exist successively, and the number of the blocks is equal to or greater than a preset fire reference value.

* * * * *